(12) United States Patent
Liu

(10) Patent No.: US 12,486,054 B2
(45) Date of Patent: Dec. 2, 2025

(54) UNMANNED AERIAL VEHICLE

(71) Applicant: AUTEL ROBOTICS CO.,LTD., Guangdong (CN)

(72) Inventor: Qiang Liu, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 37 days.

(21) Appl. No.: 18/191,081

(22) Filed: Mar. 28, 2023

(65) Prior Publication Data

US 2023/0234729 A1 Jul. 27, 2023

Related U.S. Application Data

(63) Continuation of application No. PCT/CN2021/115732, filed on Aug. 31, 2021.

(30) Foreign Application Priority Data

Oct. 16, 2020 (CN) .......................... 202011109648.4

(51) Int. Cl.
*B64U 10/20* (2023.01)
*B64C 5/16* (2006.01)
(Continued)

(52) U.S. Cl.
CPC .......... *B64U 10/20* (2023.01); *B64C 29/0025* (2013.01); *B64C 29/0033* (2013.01);
(Continued)

(58) Field of Classification Search
CPC ........ B64U 10/14; B64U 10/20; B64U 10/25; B64U 20/90; B64U 20/92; B64U 20/94;
(Continued)

(56) References Cited

U.S. PATENT DOCUMENTS 5,042,747 A * 8/1991 Rabouyt ................. B64C 27/02
244/6
5,758,844 A * 6/1998 Cummings ......... B64C 29/0033
244/66
(Continued)

FOREIGN PATENT DOCUMENTS

CN 205418086 U 8/2016
CN 206125442 U 4/2017
(Continued)

OTHER PUBLICATIONS

English translation of CN109436314A. Description and claims. (Year: 2019).*
(Continued)

*Primary Examiner* — Philip J Bonzell
*Assistant Examiner* — Michael B. Kreiner

(57) ABSTRACT

An unmanned aerial vehicle includes a body, a first wing, a second wing, a first rotor assembly, a third rotor assembly, and a fourth rotor assembly. The body has a first accommodating cavity and a second accommodating cavity. The first wing and the second wing are disposed on two sides of the body. The first rotor assembly is mounted to the first wing, and the second rotor assembly is mounted to the second wing. The third rotor assembly includes a third motor and a third propeller connected to the third motor. The third motor is mounted in the first accommodating cavity and partially exposed to the body. The fourth rotor assembly includes a fourth motor and a fourth propeller connected to the fourth motor. The fourth motor is mounted in the second accommodating cavity and partially exposed to the body.

14 Claims, 6 Drawing Sheets

(51) Int. Cl.
  *B64C 29/00*    (2006.01)
  *B64U 20/94*    (2023.01)
  *B64U 20/96*    (2023.01)
  *B64U 30/297*   (2023.01)
  *B64U 40/10*    (2023.01)
  *B64U 50/19*    (2023.01)

(52) U.S. Cl.
  CPC ............. *B64U 20/94* (2023.01); *B64U 20/96* (2023.01); *B64U 30/297* (2023.01); *B64U 40/10* (2023.01); *B64U 50/19* (2023.01); *B64C 5/16* (2013.01)

(58) Field of Classification Search
  CPC .. B64U 30/10; B64U 30/294; B64C 29/0025; B64C 29/0033
  See application file for complete search history.

(56) References Cited

U.S. PATENT DOCUMENTS

| | | | | |
|---|---|---|---|---|
| 7,581,696 | B2* | 9/2009 | Morgan | B64C 5/06 244/45 R |
| 8,128,033 | B2* | 3/2012 | Raposo | B64U 30/26 244/171.2 |
| 9,616,995 | B2* | 4/2017 | Watkins | B64C 27/24 |
| 10,287,011 | B2* | 5/2019 | Wolff | B64U 70/80 |
| 10,501,171 | B2* | 12/2019 | Peng | B64C 25/58 |
| 10,655,728 | B2* | 5/2020 | Filter | B64C 29/0025 |
| 10,676,187 | B2* | 6/2020 | Bernhardt | B64C 29/0033 |
| 10,906,652 | B2* | 2/2021 | Ku | G06F 1/206 |
| 11,407,506 | B2* | 8/2022 | Poh | B64C 29/0025 |
| 11,635,773 | B2* | 4/2023 | Anishchenko | B64C 29/0033 244/17.17 |
| 11,964,756 | B2* | 4/2024 | Burns | B64C 5/10 |
| 11,964,759 | B2* | 4/2024 | Sabadash | B64C 19/02 |
| 12,187,467 | B2* | 1/2025 | Liu | B64U 30/291 |
| 2015/0274289 | A1* | 10/2015 | Newman | B64C 29/0033 244/12.4 |
| 2017/0240291 | A1* | 8/2017 | Kim | H01M 16/006 |
| 2018/0215465 | A1* | 8/2018 | Renteria | B64C 27/28 |
| 2020/0031464 | A1 | 1/2020 | Shafir | |
| 2020/0239134 | A1* | 7/2020 | Robertson | B64C 11/001 |
| 2020/0391859 | A1* | 12/2020 | Groninga | B64C 29/0033 |
| 2021/0195789 | A1* | 6/2021 | Li | H05K 7/20145 |
| 2021/0323663 | A1* | 10/2021 | Liang | B64U 10/20 |
| 2022/0242564 | A1* | 8/2022 | Liu | B64U 30/291 |
| 2022/0306292 | A1* | 9/2022 | Ross | B64C 39/08 |

FOREIGN PATENT DOCUMENTS

| | | | | |
|---|---|---|---|---|
| CN | 206885366 | U | | 1/2018 |
| CN | 207029543 | U | | 2/2018 |
| CN | 207045754 | U | | 2/2018 |
| CN | 208165274 | U | | 11/2018 |
| CN | 108945430 | A | | 12/2018 |
| CN | 109263946 | A | | 1/2019 |
| CN | 109436314 | A | * 3/2019 | ............ B64C 27/28 |
| CN | 112158330 | A | | 1/2021 |
| CN | 21554102 | U | | 1/2022 |

OTHER PUBLICATIONS

PCT International Search Report mailed Oct. 28, 2021; PCT/CN2021/115732.

The First Chinese Office Action dated Dec. 23, 2024; Appln. No. 202011109648.4.

* cited by examiner

UNMANNED AERIAL VEHICLE

CROSS-REFERENCE TO RELATED APPLICATIONS

This present application is a continuation application of International application No. PCT/CN2021/115732, filed on Aug. 31, 2021, which claims the benefit of priority of Chinese Patent Application No. 2020111096484, filed on Oct. 16, 2020, the entire content which is incorporated herein by reference.

TECHNICAL FIELD

Embodiments of the present invention relate to the field of unmanned aerial vehicles, and in particular, to an unmanned aerial vehicle.

BACKGROUND

A fixed-wing aerial vehicle has characteristics of a long flight time and a long range. However, takeoff and landing thereof generally require a runway for long-distance taxiing. Therefore, there is a large limitation on a use environment. Some small fixed-wing aerial vehicles adopt manners of catapult takeoff or hand-throw takeoff and parachute-assisted landing. Although special runways are not required, special catapults or professionally trained operators are required during takeoff. Although parachutes can slow down impact during landing of the aerial vehicles, certain damage is still caused to the aerial vehicles. Apparently, the manners are not ideal.

To resolve the foregoing problems of the aerial vehicles, currently, there is an aerial vehicle with two sets of spiral power systems in both a horizontal direction and a vertical direction. During takeoff and landing, a vertical lift spiral power system rotates to generate upward lift. During flying in the horizontal direction, a horizontal spiral power system can provide horizontal flight force to implement horizontal flight.

In a process of realizing the present invention, taking a heat dissipation problem of an aerial vehicle into consideration, the present invention found that motors that provide vertical lift spiral power systems are all exposed, which generates great flight resistance when the aerial vehicle implements horizontal flight (that is, fixed-wing flight), and therefore affecting a flight time.

SUMMARY

Embodiments of the present invention aim to provide an unmanned aerial vehicle, which can reduce flight resistance brought by exposed motors and can also ensure a heat dissipation effect of the motors, thereby improving flight performance of the aerial vehicle.

Embodiments of the present invention resolve the technical problems by adopting the following technical solutions. An unmanned aerial vehicle is provided, including: a body, provided with a first accommodating cavity and a second accommodating cavity, where positions of the first accommodating cavity and the second accommodating cavity are different;
  a first wing, disposed on one side of the body;
  a second wing, disposed on an other side of the body;
  a first rotor assembly, mounted to the first wing and capable of rotating relative to the body;
  a second rotor assembly, mounted to the second wing and capable of rotating relative to the body;
  a third rotor assembly, including a third motor and a third propeller connected to the third motor, the third motor being mounted in the first accommodating cavity and being partially exposed to the body;
  a fourth rotor assembly, including a fourth motor and a fourth propeller connected to the fourth motor, the fourth motor being mounted in the second accommodating cavity and being partially exposed to the body; and
  a main control board, fixed to the body and respectively connected to the first rotor assembly, the second rotor assembly, the third rotor assembly and the fourth rotor assembly.

In some embodiments, the third rotor assembly further includes a first mounting base, the first mounting base is embedded in the corresponding first accommodating cavity and the third motor is mounted on the first mounting base and is partially exposed to the body; and
  the fourth rotor assembly further includes a second mounting base, the second mounting base is embedded in the corresponding second accommodating cavity and the fourth motor is mounted on the second mounting base and is partially exposed to the body.

The length of the fourth motor exposed outside the body is consistent with a length of the third motor exposed outside the body.

In some embodiments, a first air vent is provided at a position of a bottom portion of the body corresponding to the first accommodating cavity, the first air vent being in communication with the first accommodating cavity; and
  a second air vent is provided at a position of the bottom portion of the body corresponding to the second accommodating cavity, the second air vent being in communication with the second accommodating cavity.

In some embodiments, the first mounting base is provided with a first heat dissipation hole, the first heat dissipation hole being in communication with the first accommodating cavity; and the second mounting base is provided with a second heat dissipation hole, the second heat dissipation hole being in communication with the second accommodating cavity.

In some embodiments, the first rotor assembly includes a first motor and a first propeller connected to the first motor, the first motor being mounted to the first wing; and
  the second rotor assembly includes a second motor and a second propeller connected to the second motor, the second motor being mounted to the second wing.

In some embodiments, the first wing includes a first wing body and a first wing tip; one end of the first wing body is connected to a side of the body, the first wing tip is tiltably connected to an other end of the first wing body and the first rotor assembly is fixed to the first wing tip; and
  the unmanned aerial vehicle further includes a first tilt motor, the first tilt motor being connected to the main control board and being configured to drive the first wing tip to rotate about the first wing body.

In some embodiments, the second wing includes a second wing body and a second wing tip;
  one end of the second wing body is mounted on a side of the body, the second wing tip is rotatably mounted on an other end of the second wing body and the second rotor assembly is fixed to the second wing tip; and
  the unmanned aerial vehicle further includes a second tilt motor, the second tilt motor being connected to the main control board and being configured to drive the second wing tip to rotate about the second wing body.

In some embodiments, the unmanned aerial vehicle further includes a tail wing, the tail wing being mounted at a tail portion of the body and being capable of rotating about a second pitch axis of the body.

In some embodiments, the tail wing includes a first tail wing and a second tail wing, the first tail wing being mounted on one side of the tail portion of the body, the second tail wing being mounted on an other side of the tail portion of the body and both the first tail wing and the second tail wing being capable of rotating about the body.

In some embodiments, the unmanned aerial vehicle includes a first angle adjustment mechanism and a second angle adjustment mechanism, both the first angle adjustment mechanism and the second angle adjustment mechanism being fixed to the body and connected to the main control board; and the first angle adjustment mechanism is configured to adjust an angle between the first tail wing and the body and the second angle adjustment mechanism is configured to adjust an angle between the second tail wing and the body.

In some embodiments, the first propeller, the second propeller, the third propeller and the fourth propeller are all made of carbon fiber and foam is filled into the inside of blades thereof.

The first motor is configured to drive the first propeller to rotate to provide power for the unmanned aerial vehicle, and the second motor is configured to drive the second propeller to rotate to provide power for the unmanned aerial vehicle.

The first motor, the second motor, the third motor and the fourth motor together provide pulling force to overcome gravity of the unmanned aerial vehicle to implement vertical take-off and landing and hovering in the air; and the third propeller disposed on the rotation shaft of the third motor and the fourth propeller disposed on the rotation shaft of the fourth motor provide power to overcome resistance of the unmanned aerial vehicle when the unmanned aerial vehicle is flying.

The first tilt motor and the second tilt motor respectively drive the first wing tip and the second wing tip to rotate to a vertical mode when the unmanned aerial vehicle vertically takes off or lands; and the first tilt motor and the second tilt motor respectively drive the first wing tip and the second wing tip to rotate together to a horizontal mode when the unmanned aerial vehicle is in fixed-wing level flight.

The present invention has the following beneficial effects:

In the unmanned aerial vehicle provided in the embodiments of the present invention, by partially exposing the third motor and the fourth motor to the body, heat of the third motor and the fourth motor can be dissipated through the third motor and the fourth motor when the unmanned aerial vehicle lifts vertically or hovers; and flight resistance can also be reduced when the unmanned aerial vehicle is in fixed-wing level flight, thereby improving flight performance of the aerial vehicle.

BRIEF DESCRIPTION OF THE DRAWINGS

One or more embodiments are exemplarily described with reference to the corresponding figures in the accompanying drawings and the descriptions are not to be construed as limiting the embodiments. Components in the accompanying drawings that have same reference numerals are represented as similar components and unless otherwise particularly stated, the figures in the accompanying drawings are not drawn to scale.

DETAILED DESCRIPTION

For ease of understanding the present invention, the present invention is described in further detail below with reference to the accompanying drawings and specific embodiments. It should be noted that, when an element is expressed as "being fixed to" another element, the element may be directly on the another element, or one or more intermediate elements may exist between the element and the another element. When an element is expressed as "being connected to" another element, the element may be directly connected to the another element, or one or more intermediate elements may exist between the element and the another element. In the description of this specification, orientation or position relationships indicated by terms such as "up", "down", "inside", "outside", "vertical" and "horizontal" are based on orientation or position relationships shown in the accompanying drawings and are merely used for ease of description of the present invention and for brevity of description, rather than indicating or implying that the mentioned apparatus or element needs to have a particular orientation or needs to be constructed and operated in a particular orientation, and therefore should not be understood as a limitation on the present invention. In addition, terms "first" and "second" are merely used for description and should not be understood as indicating or implying relative importance.

Unless otherwise defined, meanings of all technical and scientific terms used in this specification are the same as that usually understood by a person skilled in the technical field to which the present invention belongs. Terms used in the specification of the present invention are merely intended to describe objectives of the specific embodiments, but are not intended to limit the present invention. The term "and/or" used in this specification includes any or all combinations of one or more associated related listed items.

In addition, technical features involved in different embodiments of the present invention described below may be combined together if there is no conflict.

Figure 1:
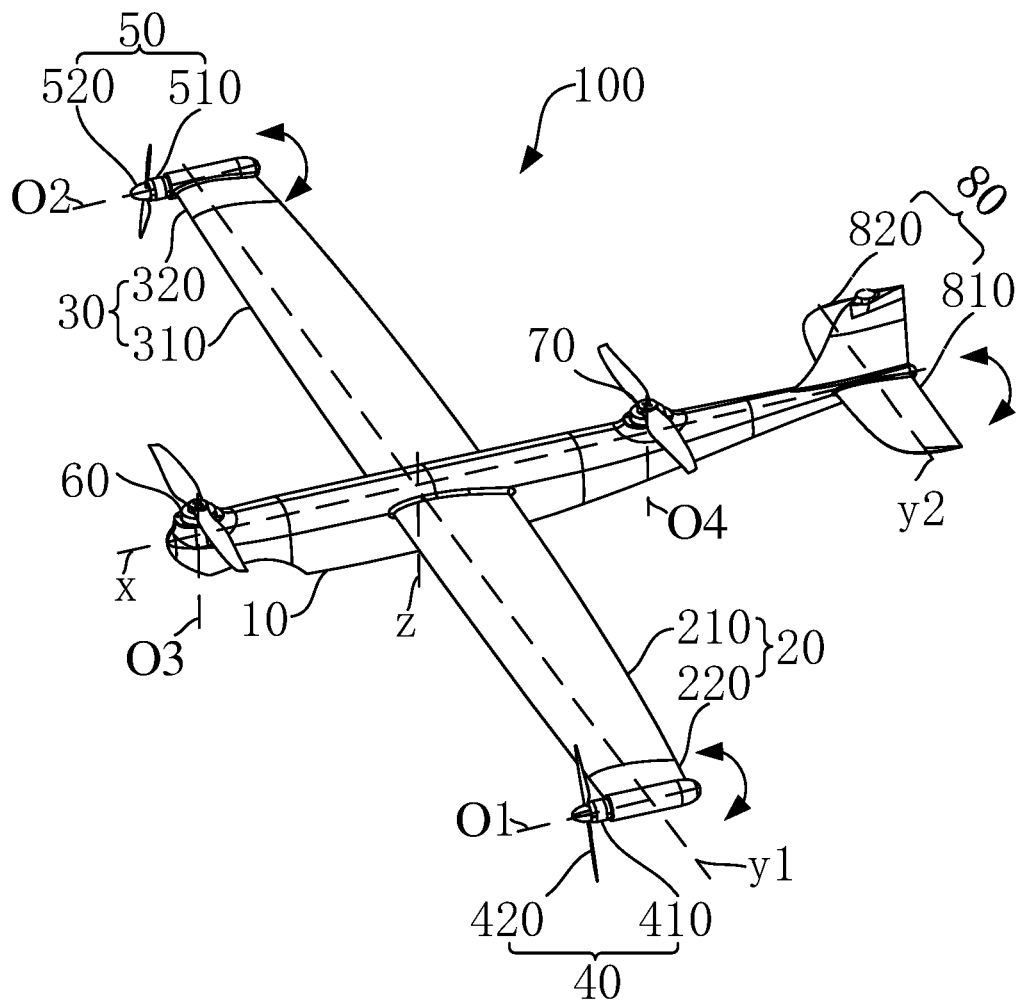
FIG. 1 is a schematic structural diagram of an unmanned aerial vehicle according to an embodiment of the present invention.

Referring to FIG. 1, an unmanned aerial vehicle 100 includes a body 10, a first wing 20, a second wing 30, a first rotor assembly 40, a second rotor assembly 50, a third rotor assembly 60, a fourth rotor assembly 70, a tail wing 80 and a main control board (not shown in the figure).

The first wing 20 and the second wing 30 are symmetrically disposed on left and right sides of the body 10. The first rotor assembly 40 is mounted to the first wing 20 and a rotation shaft O1 of the first rotor assembly 40 may rotate relative to a first pitch axis y1 of the body 10. The second rotor assembly 50 is mounted to the second wing 30 and a rotation shaft O2 of the second rotor assembly 50 may rotate relative to the first pitch axis y1 of the body 10. The third rotor assembly 60 is mounted at a first position of the body 10, the fourth rotor assembly 70 is mounted at a second position of the body 10, the second position does not overlap the first position and both a rotation shaft O3 of the third rotor assembly 60 and a rotation shaft O4 of the fourth rotor assembly 70 are perpendicular to a roll axis x of the body 10. The tail wing 80 is mounted at a tail portion of the body 10 and may rotate relative to a second pitch axis y2 of the body 10. The main control board is fixed to the body 10 and respectively connected to the first rotor assembly 40, the second rotor assembly 50, the third rotor assembly 60 and the fourth rotor assembly 70.

The first rotor assembly 40 and the second rotor assembly 50 are symmetrically disposed on two sides of the body 10. The third rotor assembly 60 and the fourth rotor assembly 70 are respectively located on two sides of the first wing 20, or the third rotor assembly 60 and the fourth rotor assembly 70 are respectively located on two sides of the second wing 30.

Through a combination of the first wing 20, the second wing 30, the first rotor assembly 40, the second rotor assembly 50, the third rotor assembly 60 and the fourth rotor assembly 70, power required for vertical takeoff and landing and fixed-wing flight of the unmanned aerial vehicle 100 is ensured; and through adjustment of the tail wing 80, a flight attitude of the unmanned aerial vehicle 100 in a flight process can be adjusted.

When the first rotor assembly 40, the second rotor assembly 50, the third rotor assembly 60 and the rotation shaft O4 of the fourth rotor assembly 70 are all perpendicular to the body 10, the unmanned aerial vehicle 100 may lift vertically and hover through the first rotor assembly 40, the second rotor assembly 50, the third rotor assembly 60 and the fourth rotor assembly 70. When the first rotor assembly 40 and the rotation shaft O2 of the second rotor assembly 50 are parallel to the body 10, the unmanned aerial vehicle 100 may perform fixed-wing flight through the first rotor assembly 40 and the second rotor assembly 50; and may adjust, in a flight process of the unmanned aerial vehicle 100, a flight attitude of the unmanned aerial vehicle 100 by adjusting a tilt angle of the tail wing 80.

The unmanned aerial vehicle 100 has the roll axis x, the first pitch axis y1, a heading axis z and the second pitch axis y2. Every two of the roll axis x, the first pitch axis y1 and the heading axis z are perpendicular to each other and the first pitch axis y1 is parallel to the second pitch axis y2. The roll axis x, the first pitch axis y1, the heading axis z and the second pitch axis y2 are all virtual straight lines defined for ease of description in the embodiments of the present application. During vertical take-off and landing, the unmanned aerial vehicle 100 takes off and lands substantially along the heading axis z. During enduring flight, the unmanned aerial vehicle 100 flies substantially along the roll axis x. During forward and backward pitching, the unmanned aerial vehicle 100 rotates substantially along the first pitch axis y1.

In addition, the tail wing 80 may rotate around the second pitch axis y2 of the body 10, which means that under a premise that a plane where the tail wing is located intersects a plane where the roll axis x of the body 10 is located, the plane where the tail wing is located rotates clockwise or counterclockwise around an intersection line where the plane where the tail wing is located intersects the plane where the body 10 is located.

Figure 2:
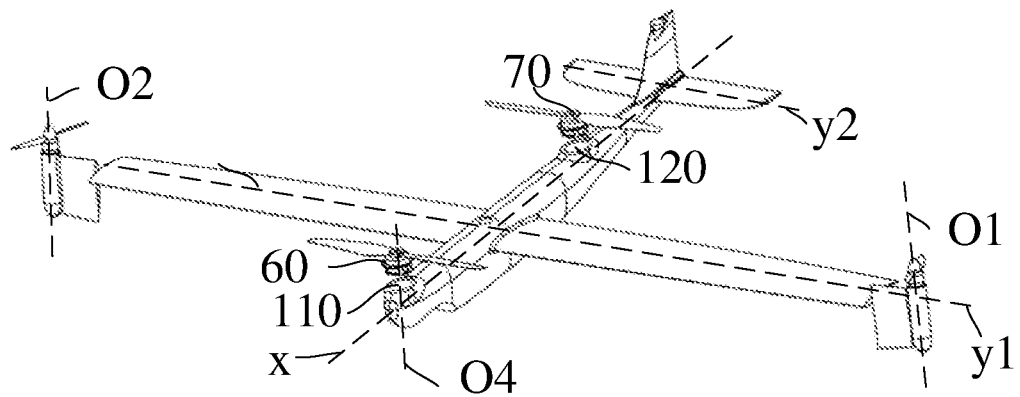
FIG. 2 is a schematic diagram of mounting a third rotor assembly and a fourth rotor assembly in the unmanned aerial vehicle shown in FIG. 1.

Referring to FIG. 2, the body 10 is provided with an accommodating cavity (not shown in the figure) and the main control board is fixed to and accommodated in the accommodating cavity.

A first opening 110 and a second opening 120 are provided at a top portion of the body 10, the first opening 110 being disposed at the first position of the body 10 and the second opening 120 being disposed at the second position of the body 10. The first opening 110 and the second opening 120 are disposed at intervals along an extension direction of the roll axis x of the body 10 and are both in communication with the accommodating cavity. The first opening 110 is configured to expose the third rotor assembly 60 and the first opening is also configured to support a wire of the main control board in passing through, to enable the third rotor assembly 60 to be electrically connected to the main control board. The second opening 120 is configured to expose the fourth rotor assembly 70 and the second opening 120 is also configured to support a wire of the main control board in passing through, to enable the fourth rotor assembly 70 to be electrically connected to the main control board.

A third opening (not shown in the figure) and a fourth opening (not shown in the figure) are oppositely disposed on two sides of the body 10 and are both in communication with the accommodating cavity. The third opening is configured to support a wire of the main control board in passing through, to enable the first rotor assembly 40 to be electrically connected to the main control board. The fourth opening is configured to support a wire of the main control board in passing through, to enable the second rotor assembly 50 to be electrically connected to the main control board.

A fifth opening (not shown in the figure) and a sixth opening (not shown in the figure) are oppositely disposed on two sides of the tail portion of the body 10 and are both in communication with the accommodating cavity. Both the fifth opening and the sixth opening are configured to mount the tail wing 80.

It may be understood that, a manner in which the main control board is mounted on the body 10 is not limited to the foregoing manner and may alternatively be another manner. For example:

The accommodating cavity includes a first accommodating cavity and a second accommodating cavity, the first accommodating cavity being in communication with the first opening 110 and the second accommodating cavity being in communication with the second opening 120. One part of the third rotor assembly 60 is mounted in the first accommodating cavity and an other part extends out of the first opening 110. One part of the fourth rotor assembly 70 is mounted in the second accommodating cavity and an other part extends out of the second opening 120. The main control board may be mounted in the first accommodating cavity or the second accommodating cavity, a communicating hole is provided between the first accommodating cavity and the second accommodating cavity and both the third opening and the fourth opening are in communication with the communicating hole. When the main control board is mounted in the first accommodating cavity, the main control board is connected to the fourth rotor assembly 70 located in the second accommodating cavity through the communicating hole. Similarly, when the main control board is mounted in the second accommodating cavity, the main control board is connected to the third rotor assembly 60 located in the first accommodating cavity through the communicating hole.

Both the third opening and the fourth opening are in communication with the communicating hole. Therefore, regardless of whether the third opening and the fourth opening are in communication with the first accommodating cavity or the second accommodating cavity, the main control board can be connected to the first rotor assembly 40 and the second rotor assembly 50.

In some embodiments, the first accommodating cavity and the second accommodating cavity may be separated by the main control board. In other words, when the main control board is mounted in the accommodating cavity, the main control board separates the accommodating cavity into the first accommodating cavity and the second accommodating cavity and two surfaces of the main control board are respectively connected to the third rotor assembly 60 and the fourth rotor assembly 70. In this case, both the third opening and the fourth opening may be in communication with the first accommodating cavity, or both the third opening and the fourth opening may be in communication with the second accommodating cavity. The main control board is connected to the first rotor assembly 40 and the second rotor assembly 50 through the third opening and the fourth opening.

The accommodating cavity includes a first accommodating cavity and a second accommodating cavity, the first accommodating cavity being in communication with the first opening 110 and the second accommodating cavity being in communication with the second opening 120. One part of the third rotor assembly 60 is mounted in the first accommodating cavity and an other part extends out of the first opening 110. One part of the fourth rotor assembly 70 is mounted in the second accommodating cavity and an other part extends out of the second opening 120. The main control board is mounted on an outer surface of the body 10. The main control board is wirelessly connected to the first rotor assembly 40, the second rotor assembly 50, the third rotor assembly 60 and the fourth rotor assembly 70, or wires connected between the main control board and the first rotor assembly 40, the second rotor assembly 50, the third rotor assembly 60 and the fourth rotor assembly 70 are all disposed outside the body 10.

When the wires connected between the main control board and the first rotor assembly 40, the second rotor assembly 50, the third rotor assembly 60 and the fourth rotor assembly 70 are all disposed outside the body 10, a protection device is disposed outside the body 10 and is configured to protect the main control board and the wires, to prevent the main control board and the wires from being directly exposed and easily damaged.

The accommodating cavity includes a first accommodating cavity, a second accommodating cavity and a third accommodating cavity, the first accommodating cavity being in communication with the first opening 110 and the second accommodating cavity being in communication with the second opening 120. The third rotor assembly 60 is partially mounted in the first accommodating cavity and partially extends out of the first opening 110. The fourth rotor assembly 70 is partially mounted in the second accommodating cavity and partially extends out of the second opening 120. The main control board is mounted in the third accommodating cavity. Both the third opening and the fourth opening are in communication with the third accommodating cavity. A communicating hole is respectively provided between the third accommodating cavity and the first accommodating cavity and between the third accommodating cavity and the second accommodating cavity. The main control board is connected to the third rotor assembly 60 and the fourth rotor assembly 70 through the communicating hole.

Both the third opening and the fourth opening are in communication with the third accommodating cavity and the third accommodating cavity is also in communication with both the first accommodating cavity and the second accommodating cavity. Therefore, regardless of whether the third opening and the fourth opening are in communication with the first accommodating cavity or the second accommodating cavity through the third accommodating cavity, the main control board can be connected to the first rotor assembly 40 and the second rotor assembly 50.

The first wing 20 and the second wing 30 cross the body 10. However, the third rotor assembly 60 and the fourth rotor assembly 70 are located on the body 10 and the first rotor assembly 40 and the second rotor assembly 50 are respectively located on the first wing 20 and the second wing 30. For ease of connections between the main control board and the first rotor assembly 40, the second rotor assembly 50, the third rotor assembly 60 and the fourth rotor assembly 70, preferably, the main control board is mounted at a crossed position. In other words, when the main control board is mounted in an accommodating cavity, the main control board is also located at the crossed position. Certainly, the main control board may alternatively be mounted at any position of the accommodating cavity, as long as it can be ensured that the main control board separates the accommodating cavity into the first accommodating cavity and the second accommodating cavity. The present application imposes no limitation thereon.

The following describes by using an example in which the accommodating cavity includes the first accommodating cavity and the second accommodating cavity.

Both the first accommodating cavity and the second accommodating cavity are mounting spaces enclosed by a housing of the body 10.

It can be learned from the foregoing description that, positions of the first accommodating cavity and the second accommodating cavity are different. Still referring to FIG. 1, the first wing 20 includes a first wing body 210 and a first wing tip 220. One end of the first wing body 210 is mounted on a left side of the body 10, the first wing tip 220 is tiltably mounted on an other end of the first wing body 210 and the first rotor assembly 40 is fixed to the first wing tip 220.

Further, a first axial space (not shown in the figure) is provided in the first wing body 210 and is in communication with the third opening. The first axial space is for supporting the wire of the main control board in passing through, to enable the first rotor assembly 40 to be electrically connected to the main control board.

A mechanism configured to drive the first wing tip 220 to tilt relative to the first wing body 210 may be any mechanism. For example, the unmanned aerial vehicle 100 further includes a first tilt motor (not shown in the figure). The first tilt motor is mounted in the first axial space and is connected to the main control board, the first wing tip 220 is connected to a rotation shaft of the first tilt motor and the first tilt motor is configured to drive the first wing tip 220 to tilt relative to the first wing body 210.

The second wing 30 includes a second wing body 310 and a second wing tip 320. One end of the second wing body 310 is mounted on a right side of the body 10, the second wing tip 320 is rotatably mounted on an other end of the second wing body 310 and the second rotor assembly 50 is fixed to the second wing tip 320.

Further, a second axial space is provided in the second wing body 310 and is in communication with the fourth opening. The second axial space is for supporting the wire of the main control board in passing through, to enable the second rotor assembly 50 to be electrically connected to the main control board.

A mechanism configured to drive the second wing tip 320 to tilt relative to the second wing body 310 may be any mechanism. For example, the unmanned aerial vehicle 100 further includes a second tilt motor (not shown in the figure). The second tilt motor is mounted in the second axial space and is connected to the main control board, the second wing tip 320 is connected to a rotation shaft of the second tilt motor and the second tilt motor is configured to drive the second wing tip 320 to tilt relative to the second wing body 310.

The first rotor assembly 40 includes a first motor 410 and a first propeller 420 connected to a rotation shaft of the first motor 410, the first motor 410 being fixed to the first wing tip 220. The first motor 410 is configured to drive the first propeller 420 to rotate to provide power for the unmanned aerial vehicle 100.

It may be understood that, the rotation shaft O1 of the first rotor assembly 40 is the rotation shaft of the first motor 410.

The second rotor assembly 50 includes a second motor 510 and a second propeller 520 connected to a rotation shaft of the second motor 510, the second motor 510 being fixed to the second wing tip 320. The second motor 510 is configured to drive the second propeller 520 to rotate to provide power for the unmanned aerial vehicle 100.

It may be understood that, the rotation shaft O2 of the second rotor assembly 50 is the rotation shaft of the second motor 510.

The third rotor assembly 60 includes a third motor 610 and a third propeller 620 connected to a rotation shaft of the third motor 610, the third motor 610 being mounted in the first accommodating cavity and being partially exposed to the body 10 through the first opening 110. The rotation shaft of the third motor 610 is perpendicular to the roll axis x of the body 10. The third motor 610 is configured to drive the third propeller 620 to rotate to provide power for the unmanned aerial vehicle 100.

It may be understood that, the rotation shaft O3 of the third rotor assembly 60 is the rotation shaft of the third motor 610.

Figure 3:
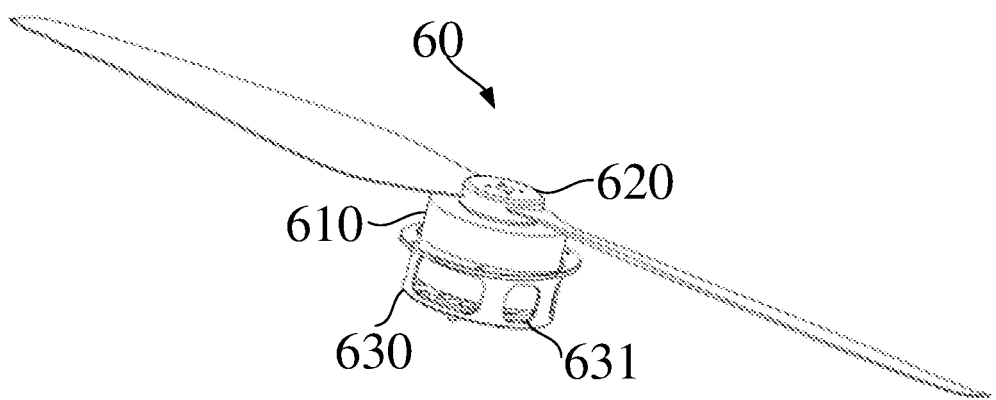
FIG. 3 is a schematic structural diagram of a third rotor assembly in the unmanned aerial vehicle shown in FIG. 1.

Referring to FIG. 3, in some embodiments, the third rotor assembly 60 further includes a first mounting base 630, the first mounting base 630 is embedded in the corresponding first accommodating cavity and covers the first opening 110 and the third motor 610 is fixed on the first mounting base 630 and is partially exposed to the body 10, so that heat of the third motor 610 can be dissipated into air through the third motor 610 and the first mounting base 630.

It may be understood that, the first mounting base 630 is made of a metal material with good thermal conductivity and an airflow generated by the third propeller 620 flows through the first mounting base 630.

Through the foregoing manner, when the unmanned aerial vehicle 100 takes off and lands vertically or hovers, one part of the heat of the third motor 610 is taken away by the airflow generated by the third propeller 620 and an other part is conducted to the first mounting base 630 and is taken away by the airflow flowing through the first mounting base 630.

Figure 4:
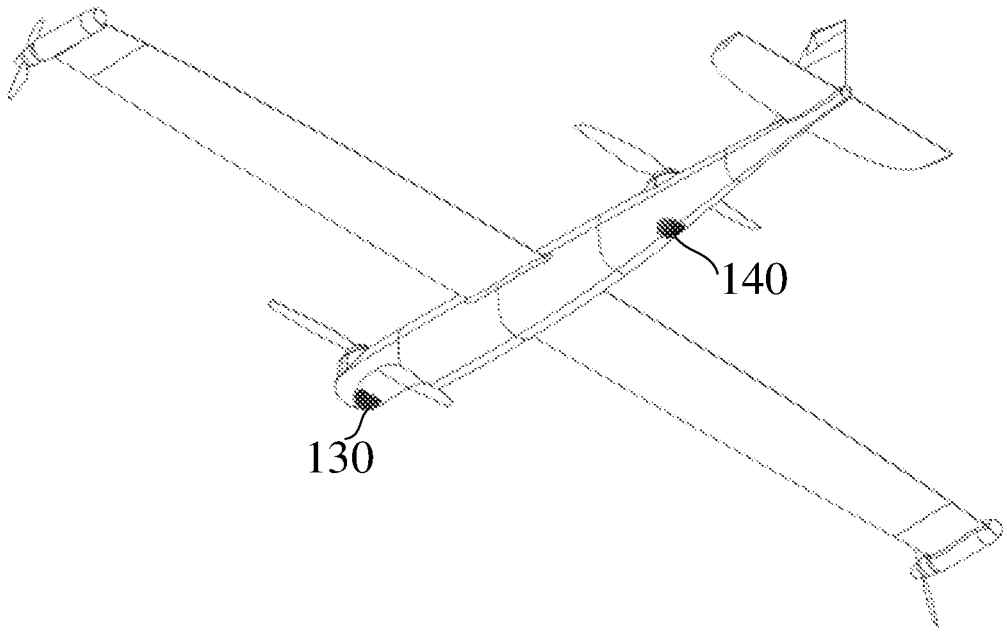
FIG. 4 is a schematic structural diagram of a first air vent and a second air vent in the unmanned aerial vehicle shown in FIG. 1.

Referring to FIG. 4, in some embodiments, to further enhance heat dissipation of the third motor 610, the first mounting base 630 is provided with a first heat dissipation hole 631, the first heat dissipation hole 631 being in communication with the first accommodating cavity; and a first air vent 130 is provided at a position of a bottom portion of the body 10 corresponding to the first accommodating cavity, the first air vent 130 being in communication with the first accommodating cavity. The first accommodating cavity is in communication with the outside through the first air vent 130, which improves a heat exchange rate and promotes the heat dissipation of the third motor 610.

The rotation shaft O3 of the third rotor assembly 60 is perpendicular to the roll axis x of the body 10. However, the first opening 110 is in communication with the first accommodating cavity and the first opening 110 is configured to enable the third motor 610 to be partially exposed to the body 10. To better perform the heat dissipation of the third motor 610, preferably, the first air vent 130 is disposed directly below the first opening 110. Certainly, the first air vent 130 may alternatively be disposed at any position of the bottom portion of the body 10, as long as it can be ensured that the first air vent 130 is in communication with the first accommodating cavity. The present application imposes no limitation thereon.

In some embodiments, an inclined surface is provided at the bottom portion of the body 10 and the first air vent 130 is disposed on the inclined surface, so that an aperture of the first air vent 130 is increased under a condition of a same cross-section, thereby enhancing a heat dissipation effect.

There may be a plurality of first heat dissipation holes 631, the plurality of first heat dissipation holes 631 being evenly distributed on the first mounting base 630.

The fourth rotor assembly 70 includes a fourth motor 710 and a fourth propeller 720 connected to a rotation shaft of the fourth motor 710, the fourth motor 710 being mounted in the second accommodating cavity and being partially exposed to the body 10 through the second opening 120. The rotation shaft of the fourth motor 710 is perpendicular to the roll axis x of the body 10. The fourth motor 710 is configured to drive the fourth propeller 720 to rotate to provide power for the unmanned aerial vehicle 100.

It may be understood that, the rotation shaft O4 of the fourth rotor assembly 70 is the rotation shaft of the fourth motor 710.

Figure 5:
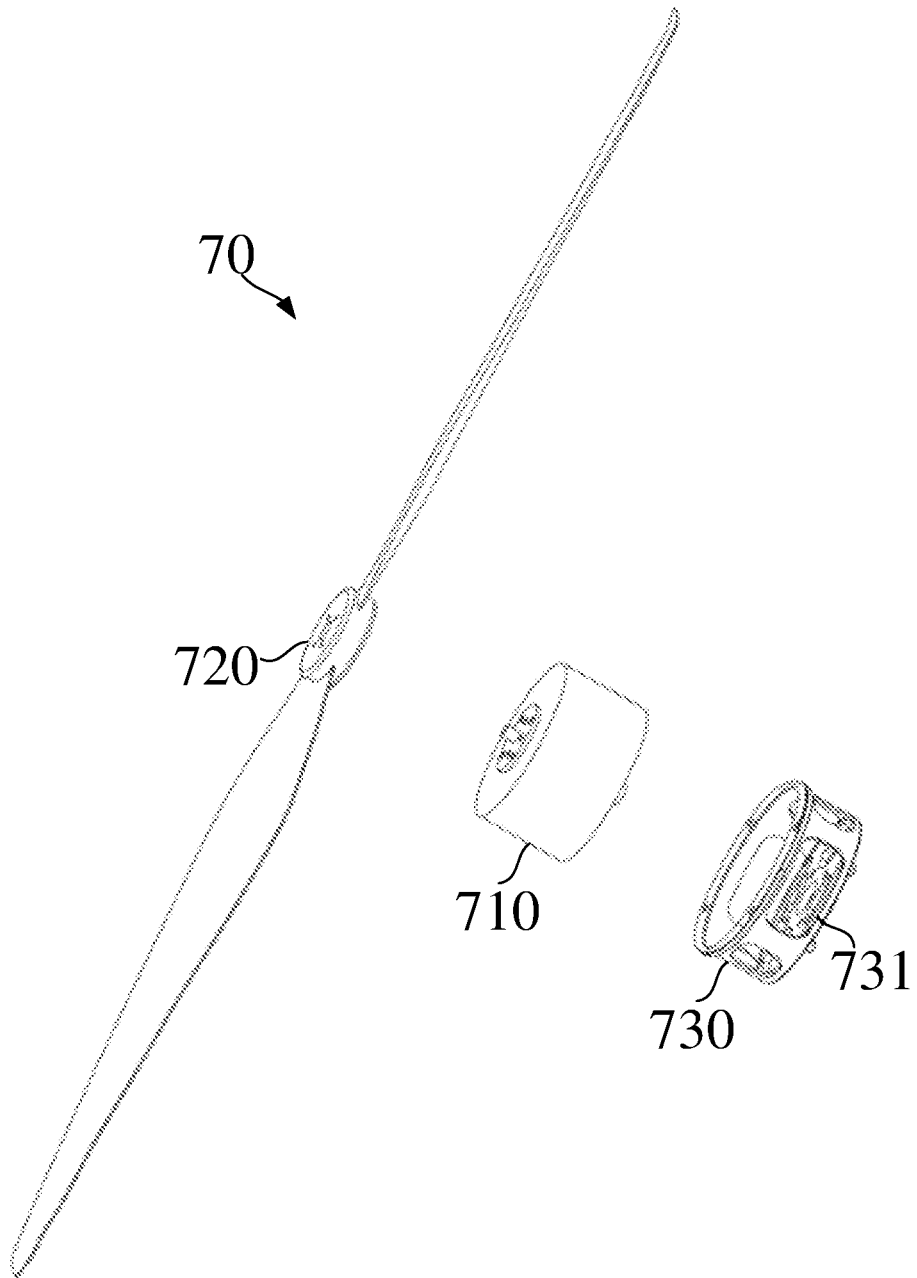
FIG. 5 is a schematic exploded view of a fourth rotor assembly in the unmanned aerial vehicle shown in FIG. 1.

Referring to FIG. 5, in some embodiments, the fourth rotor assembly 70 further includes a second mounting base 730, the second mounting base 730 is embedded in the corresponding second accommodating cavity and covers the second opening 120 and the fourth motor 710 is fixed on the second mounting base 730 and is partially exposed to the body 10, so that heat of the fourth motor 710 can be dissipated into air through the fourth motor 710 and the second mounting base 730.

In some embodiments, the second mounting base 730 is made of a metal material with good thermal conductivity and an airflow generated by the fourth propeller 720 flows through the second mounting base 730.

Through the foregoing manner, when the unmanned aerial vehicle 100 takes off and lands vertically or hovers, one part of the heat of the fourth motor 710 is taken away by the airflow generated by the fourth propeller 720 and an other part is conducted to the second mounting base 730 and is taken away by the airflow flowing through the second mounting base 730.

In some embodiments, to further enhance heat dissipation of the fourth motor 710, the second mounting base 730 is provided with a second heat dissipation hole 731, the second heat dissipation hole 731 being in communication with the second accommodating cavity; and a second air vent 140 is provided at a position of the bottom portion of the body 10 corresponding to the second accommodating cavity, the second air vent 140 being in communication with the second accommodating cavity. The second accommodating cavity is in communication with the outside through the second air vent 140, which improves a heat exchange rate and promotes the heat dissipation of the fourth motor 710.

The rotation shaft O4 of the fourth rotor assembly 70 is perpendicular to the roll axis x of the body 10. However, the second opening 120 is in communication with the second accommodating cavity and the second opening 120 is configured to enable the fourth motor 710 to be partially exposed to the body 10. To better perform the heat dissipation of the fourth motor 710, preferably, the second air vent 140 is disposed directly below the second opening 120. Certainly, the second air vent 140 may alternatively be disposed at any position of the bottom portion of the body 10, as long as it can be ensured that the second air vent 140 is in communication with the second accommodating cavity. The present application imposes no limitation thereon.

There may be a plurality of second heat dissipation holes 731, the plurality of second heat dissipation holes 731 being evenly distributed on the second mounting base 730.

In some embodiments, an air intake grille is respectively disposed on the first air vent 130 and the second air vent 140. The air intake grille is configured to prevent debris in outside air from entering the accommodating cavity, thereby ensuring stability of the main control board and other electrical elements (not shown in the figure) in the accommodating cavity.

Through the foregoing manner, compared with that the motors are entirely exposed outside the body 10, the third motor 610 and the fourth motor 710 can reduce flight resistance when the unmanned aerial vehicle 100 in this embodiment of the present application is in fixed-wing flight, thereby improving an endurance capability of the aerial vehicle; and the heat dissipation of the third motor 610 and the fourth motor 710 can also be ensured when the unmanned aerial vehicle 100 vertically lifts or hovers.

In some embodiments, a length of the third motor 610 exposed outside the body 10 may be 5%, 10%, 20%, 30%, 40%, 50% or 60% of a total length of the third motor 610.

A length of the fourth motor 710 exposed outside the body 10 is consistent with the length of the third motor 610 exposed outside the body 10. Details are not described herein again. The tail wing 80 includes a first tail wing 810 and a second tail wing 820. The first tail wing 810 is mounted on a left side of the tail portion of the body 10 and the second tail wing 820 is mounted on a right side of the tail portion of the body 10. Both the first tail wing 810 and the second tail wing 820 may rotate around the second pitch axis y2 of the body 10, to adjust a flight attitude of the unmanned aerial vehicle 100 in a flight process.

Figure 6:
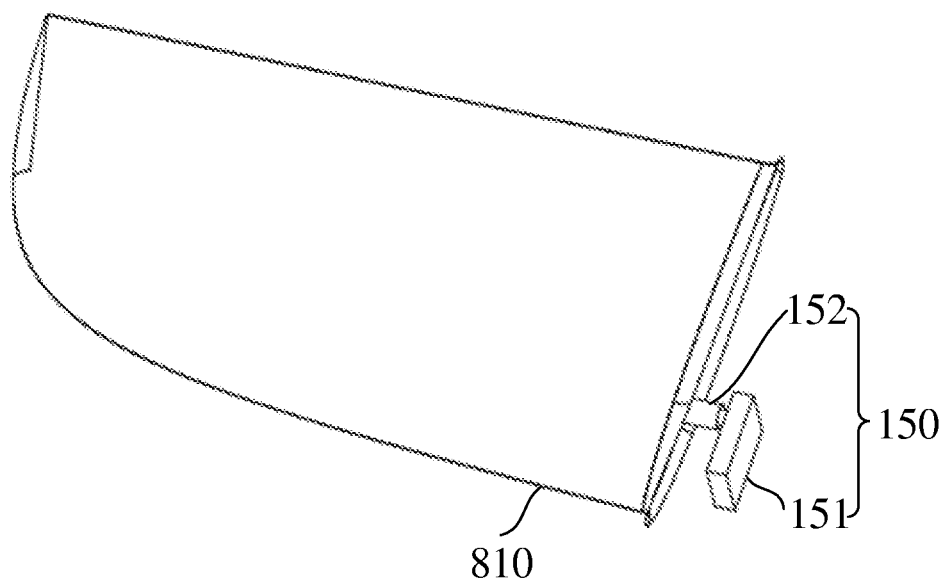
FIG. 6 is a schematic structural diagram of a first angle adjustment mechanism in the unmanned aerial vehicle shown in FIG. 1.

Referring to FIG. 6, a mechanism configured to drive the first tail wing 810 to rotate relative to the second pitch axis y2 of the body 10 may be any mechanism. For example, the unmanned aerial vehicle 100 further includes a first angle adjustment mechanism 150. The first angle adjustment mechanism 150 is fixed to and accommodated in the tail portion of the body 10. The first angle adjustment mechanism 150 is configured to adjust an angle between the first tail wing 810 and the body 10. The first angle adjustment mechanism 150 includes a first adjustment motor 151 and a first connecting shaft 152. The first adjustment motor 151 is fixed to the tail portion of the body 10 and is connected to the main control board. One end of the first connecting shaft 152 is connected to a rotation shaft of the first adjustment motor 151 and an other end of the first connecting shaft 152 is fixed on the first tail wing 810. The first adjustment motor 151 is configured to drive the first tail wing 810 to rotate around the second pitch axis y2 of the body 10, to adjust the angle between the first tail wing 810 and the body 10.

A mechanism configured to drive the second tail wing 820 to rotate relative to the second pitch axis y2 of the body 10 may be a gear transmission mechanism, a worm gear mechanism or the like. The present application imposes no limitation thereon. For example, the unmanned aerial vehicle 100 further includes a second angle adjustment mechanism (not shown in the figure). The second angle adjustment mechanism is fixed to and accommodated in the tail portion of the body 10. The second angle adjustment mechanism is configured to adjust an angle between the second tail wing 820 and the body 10. Specifically, the second angle adjustment mechanism includes a second adjustment motor (not shown), an external gear (not shown) and an internal gear (not shown). The second adjustment motor is fixed to the tail portion of the body 10 and is connected to the main control board. The external gear is sleeved at a rotation shaft of the second adjustment motor, the internal gear is fixed on the first tail wing 810 and the external gear is inserted into and engaged with the internal gear. The second adjustment motor is configured to drive the second tail wing 820 to rotate around the second pitch axis y2 of the body 10, to adjust the angle between the second tail wing 820 and the body 10.

Structures of the first angle adjustment mechanism 150 and the second angle adjustment mechanism may be the same or different. The present application imposes no limitation thereon.

In some embodiments, a take-off and landing buffer is respectively disposed on the first wing 20, the second wing 30 and the tail wing 80, which can reduce collisions of the unmanned aerial vehicle 100 and reduce maintenance costs.

In some embodiments, the first propeller 420, the second propeller 520, the third propeller 620 and the fourth propeller 720 are all made of carbon fiber and foam is filled into the inside of blades thereof. The propellers are light in weight and strong enough and can also absorb vibration of the propellers.

Figure 7:
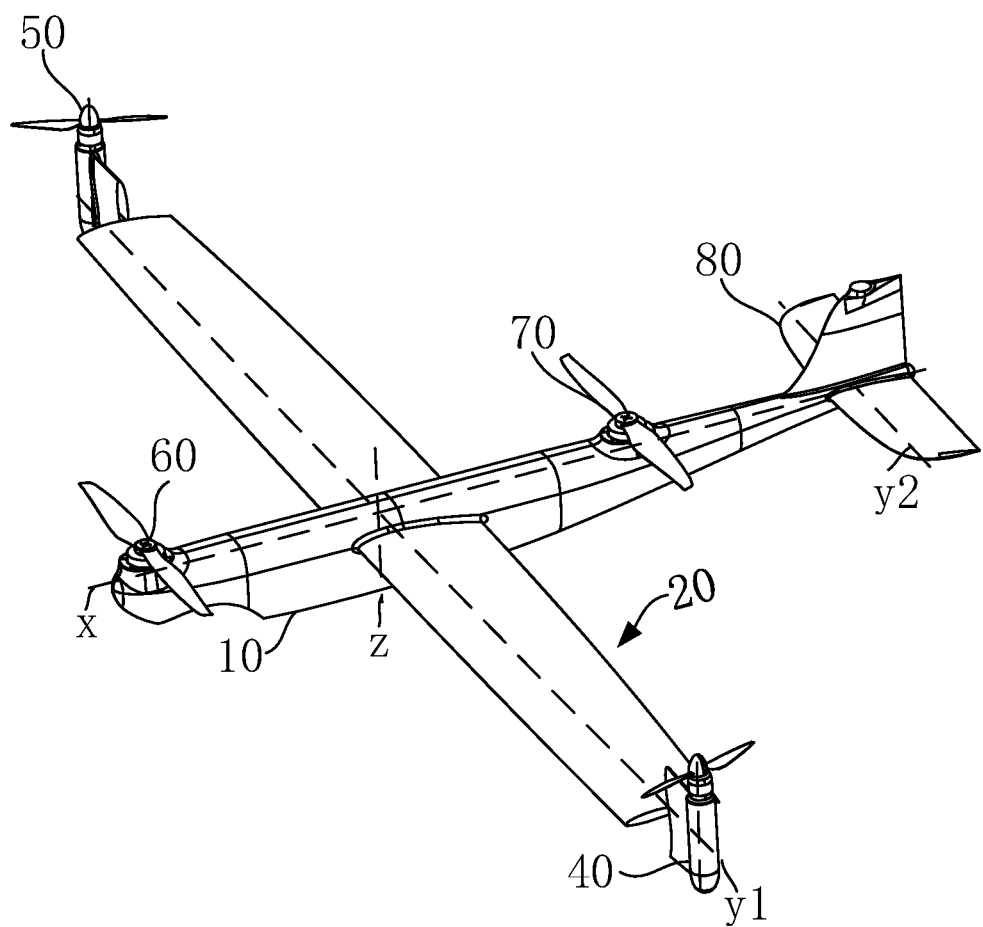
FIG. 7 is a schematic diagram of the unmanned aerial vehicle shown in FIG. 1 in a vertical lift flight attitude.

For ease of readers to understand the embodiments of the present application, a moving process of the unmanned aerial vehicle 100 is described as follows:

Referring to FIG. 7, during vertical take-off and landing, under control of the main control board, the first tilt motor and the second tilt motor respectively drive the first wing tip 220 and the second wing tip 320 to rotate to a vertical mode; and the first motor 410, the second motor 510, the third motor 610 and the fourth motor 710 together provide pulling force to overcome gravity of the unmanned aerial vehicle 100 to implement vertical take-off and landing and hovering in the air.

The foregoing vertical mode means that the rotation shaft O1 of the first rotor assembly 40 and the rotation shaft O2 of the second rotor assembly 50 are perpendicular to the body 10.

When the unmanned aerial vehicle 100 is in fixed-wing level flight, the first tilt motor and the second tilt motor respectively drive the first wing tip 220 and the second wing tip 320 to rotate together to a horizontal mode; and the third propeller 620 disposed on the rotation shaft of the third motor 610 and the fourth propeller 720 disposed on the rotation shaft of the fourth motor 710 provide power to overcome resistance of the unmanned aerial vehicle 100 when flying.

The foregoing horizontal mode means that the rotation shaft O1 of the first rotor assembly 40 and the rotation shaft O2 of the second rotor assembly 50 are parallel to the body 10.

Figure 8:
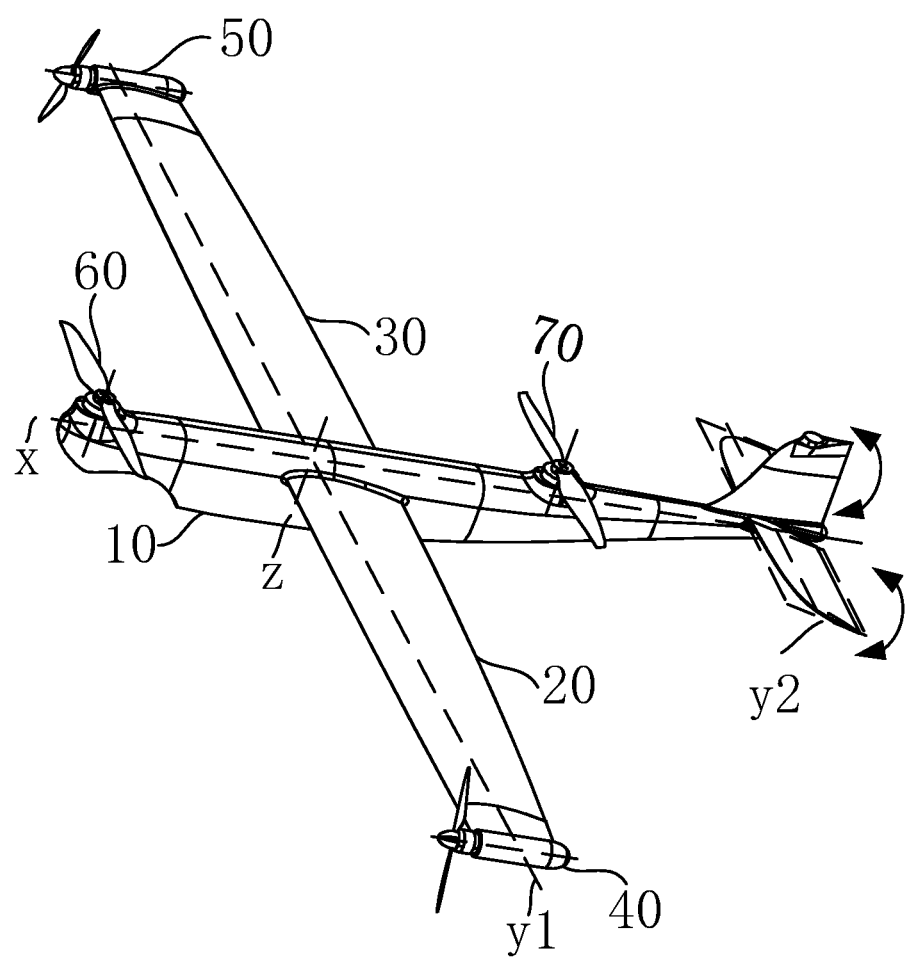
FIG. 8 is a schematic diagram of the unmanned aerial vehicle shown in FIG. 1 in a climb flight attitude.
Figure 9:
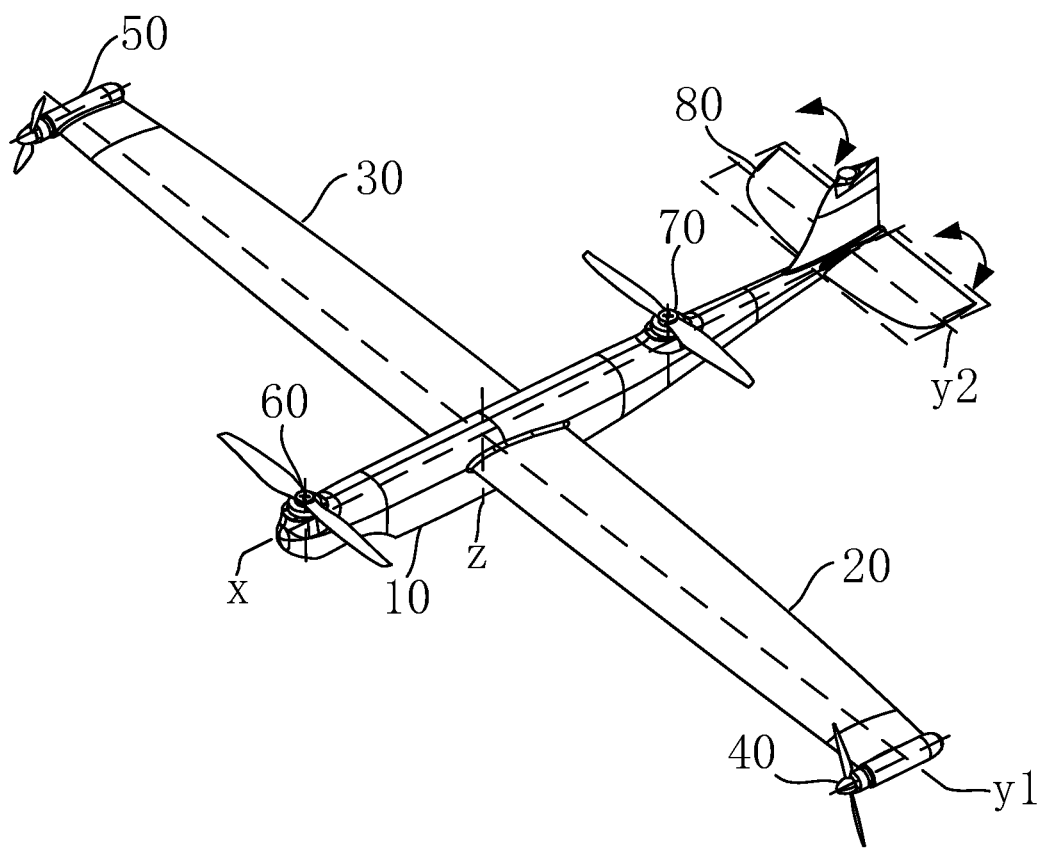
FIG. 9 is a schematic diagram of the unmanned aerial vehicle shown in FIG. 1 in a dive flight attitude.

In addition, referring to FIG. 8 and FIG. 9 together, by controlling a rotation speed of the third motor 610 and a rotation speed of the fourth motor 710, pitch control and forward and backward flight of the unmanned aerial vehicle 100 can be implemented; by controlling a rotation speed of the first motor 410 and a rotation speed of the second motor 510, roll control and left and right flight of the unmanned aerial vehicle 100 can be implemented; and by rotating the first tail wing 810 by the first adjustment motor and rotating the second tail wing 820 by the second adjustment motor, an angle difference is formed between the first tail wing 810 and the second tail wing 820 and heading control of the unmanned aerial vehicle 100 can be implemented.

In the embodiments of the present application, by partially exposing the third motor 610 and the fourth motor 710 to the body 10, heat of the third motor 610 and the fourth motor 710 can be dissipated into the outside through the third motor 610 and the fourth motor 710 when the unmanned aerial vehicle 100 lifts vertically or hovers; and flight resistance can also be reduced when the unmanned aerial vehicle is in fixed-wing level flight, thereby improving flight performance of the aerial vehicle 100.

Finally, it should be noted that the foregoing embodiments are merely used for describing the technical solutions of the present invention, but are not intended to limit the present invention. Under the ideas of the present invention, the technical features in the foregoing embodiments or different embodiments may also be combined, the steps may be performed in any order and many other changes of different aspects of the present invention also exists as described above. These changes are not provided in detail for simplicity. It should be understood by a person of ordinary skill in the art that although the present invention has been described in detail with reference to the foregoing embodiments, modifications can be made to the technical solutions described in the foregoing embodiments, or equivalent replacements can be made to some technical features in the technical solutions, and these modifications or replacements will not cause the essence of corresponding technical solutions to depart from the scope of the technical solutions in the embodiments of the present invention.

What is claimed is:

1. An unmanned aerial vehicle, comprising:
    a fuselage body provided with a first accommodating cavity and a second accommodating cavity, wherein positions of the first accommodating cavity and the second accommodating cavity are different, the fuselage body defining a forward nose, an aft tail, and an axis extending from the forward nose to the aft tail, the streamlined fuselage body being configured to move through the air resulting in the air moving in the direction of the axis from the forward nose to the aft tail in relation to the fuselage body;
    a first wing disposed on one side of the fuselage body and configured to generate lift when the fuselage body is moving in a direction where the relative wind moves from the forward portion of the fuselage body to the aft portion of the fuselage body;
    a second wing disposed on an other side of the fuselage body and configured to generate lift when the fuselage body is moving in a direction where the relative wind moves from the forward portion of the fuselage body to the aft portion of the fuselage body;
    a first rotor assembly, mounted to the first wing and capable of rotating relative to the fuselage body;
    a second rotor assembly, mounted to the second wing and capable of rotating relative to the fuselage body;
    a third rotor assembly including a third motor and a third propeller connected to the third motor, the third motor being embedded in the first accommodating cavity and the third propeller being mounted outside and above the fuselage body;
    a fourth rotor assembly including a fourth motor and a fourth propeller connected to the fourth motor, the fourth motor being embedded in the second accommodating cavity and the fourth propeller being mounted outside and above the fuselage body;
    a first air vent positioned at a bottom portion of the fuselage body corresponding to the first accommodating cavity, the first air vent being in communication with the first accommodating cavity, wherein the first air vent defines an opening at the intersection of the first air vent and the fuselage body, and wherein the surface of the fuselage body at the opening is inclined, wherein a vector perpendicular to the surface of the fuselage body at the opening and directed away from the fuselage body includes a component parallel to the fuselage axis and directed rearward toward the aft tail; and
    a second air vent is positioned at a bottom portion of the fuselage body corresponding to the second accommodating cavity, the second air vent being in communication with the second accommodating cavity; and
    a main control board fixed to the fuselage body, enclosed within the fuselage body, and connected to the first rotor assembly, the second rotor assembly, the third rotor assembly and the fourth rotor assembly.

2. The unmanned aerial vehicle according to claim 1, wherein
    the third rotor assembly further comprises a first mounting base, the first mounting base is embedded in the corresponding first accommodating cavity and the third motor is mounted on the first mounting base and is partially exposed to the fuselage body; and
    the fourth rotor assembly further comprises a second mounting base, the second mounting base is embedded in the corresponding second accommodating cavity and the fourth motor is mounted on the second mounting base and is partially exposed to the fuselage body.

3. The unmanned aerial vehicle according to claim 2, wherein
    the first mounting base is provided with a first heat dissipation hole, the first heat dissipation hole being in communication with the first accommodating cavity; and the second mounting base is provided with a second heat dissipation hole, the second heat dissipation hole being in communication with the second accommodating cavity.

4. The unmanned aerial vehicle according to claim 2, wherein a length of the fourth motor exposed outside the fuselage body is consistent with a length of the third motor exposed outside the fuselage body.

5. The unmanned aerial vehicle according to claim 1, characterized in that
    the first rotor assembly comprises a first motor and a first propeller connected to the first motor, the first motor being mounted to the first wing; and the second rotor assembly comprises a second motor and a second propeller connected to the second motor, the second motor being mounted to the second wing.

6. The unmanned aerial vehicle according to claim 5, wherein the first propeller, the second propeller, the third propeller and the fourth propeller are all made of carbon fiber and foam is filled into the inside of blades thereof.

7. The unmanned aerial vehicle according to claim 5, wherein the first motor is configured to drive the first propeller to rotate to provide power for the unmanned aerial vehicle, and the second motor is configured to drive the second propeller to rotate to provide power for the unmanned aerial vehicle.

8. The unmanned aerial vehicle according to claim 5, wherein
the first motor, the second motor, the third motor and the fourth motor together provide pulling force to overcome gravity of the unmanned aerial vehicle to implement vertical take-off and landing and hovering in the air; and
the third propeller disposed on a rotation shaft of the third motor and the fourth propeller disposed on a rotation shaft of the fourth motor provide power to overcome resistance of the unmanned aerial vehicle when the unmanned aerial vehicle is flying.

9. The unmanned aerial vehicle according to claim 1, wherein
the first wing comprises a first wing body and a first wing tip;
one end of the first wing body is connected to a side of the body, the first wing tip is tiltably connected to an other end of the first wing body and the first rotor assembly is fixed to the first wing tip; and
the unmanned aerial vehicle further comprises a first tilt motor, the first tilt motor being connected to the main control board and being configured to drive the first wing tip to rotate about the first wing body.

10. The unmanned aerial vehicle according to claim 9, wherein
the second wing comprises a second wing body and a second wing tip;
one end of the second wing body is mounted on a side of the fuselage body, the second wing tip is rotatably mounted on another end of the second wing body and the second rotor assembly is fixed to the second wing tip; and
the unmanned aerial vehicle further comprises a second tilt motor, the second tilt motor being connected to the main control board and being configured to drive the second wing tip to rotate about the second wing body.

11. The unmanned aerial vehicle according to claim 10, wherein
the first tilt motor and the second tilt motor respectively drive the first wing tip and the second wing tip to rotate to a vertical mode when the unmanned aerial vehicle vertically takes off or lands; and
the first tilt motor and the second tilt motor respectively drive the first wing tip and the second wing tip to rotate together to a horizontal mode when the unmanned aerial vehicle is in fixed-wing level flight.

12. The unmanned aerial vehicle according to claim 1, wherein
the unmanned aerial vehicle further comprises a tail wing, the tail wing being mounted at a tail portion of the fuselage body and being capable of rotating about the fuselage body.

13. The unmanned aerial vehicle according to claim 12, wherein
the tail wing comprises a first tail wing and a second tail wing, the first tail wing being mounted on one side of the tail portion of the fuselage body, the second tail wing being mounted on an other side of the tail portion of the fuselage body and both the first tail wing and the second tail wing being capable of rotating about the fuselage body.

14. The unmanned aerial vehicle according to claim 13, wherein
the unmanned aerial vehicle comprises a first angle adjustment mechanism and a second angle adjustment mechanism, both the first angle adjustment mechanism and the second angle adjustment mechanism being fixed to the fuselage body and connected to the main control board; and
the first angle adjustment mechanism is configured to adjust an angle between the first tail wing and the fuselage body and the second angle adjustment mechanism is configured to adjust an angle between the second tail wing and the fuselage body.

* * * * *